United States Patent
Li et al.

(10) Patent No.: US 12,001,660 B2
(45) Date of Patent: Jun. 4, 2024

(54) PAGE PRESENTATION METHOD, DISPLAY SYSTEM AND STORAGE MEDIUM

(71) Applicant: BOE TECHNOLOGY GROUP CO., LTD., Beijing (CN)

(72) Inventors: Yingjie Li, Beijing (CN); Hao Fang, Beijing (CN); Yuanli Qu, Beijing (CN); Qifeng Shi, Beijing (CN); Shijie Cao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 576 days.

(21) Appl. No.: 17/042,348

(22) PCT Filed: Dec. 20, 2019

(86) PCT No.: PCT/CN2019/127139
§ 371 (c)(1),
(2) Date: Sep. 28, 2020

(87) PCT Pub. No.: WO2021/120206
PCT Pub. Date: Jun. 24, 2021

(65) Prior Publication Data
US 2023/0107617 A1  Apr. 6, 2023

(51) Int. Cl.
*G06F 3/048* (2013.01)
*G06F 3/01* (2006.01)
(Continued)

(52) U.S. Cl.
CPC .......... *G06F 3/04842* (2013.01); *G06F 3/013* (2013.01); *G06F 3/0486* (2013.01); *G06F 3/167* (2013.01)

(58) Field of Classification Search
CPC .... G06F 3/04842; G06F 3/013; G06F 3/0486; G06F 3/167
See application file for complete search history.

(56) References Cited

U.S. PATENT DOCUMENTS

| | | | |
|---|---|---|---|
| 11,546,552 B1 * | 1/2023 | Gupta | G06Q 10/10 |
| 2003/0081115 A1 * | 5/2003 | Curry | H04N 7/15 |
| | | | 381/26 |

(Continued)

FOREIGN PATENT DOCUMENTS

| | | | | |
|---|---|---|---|---|
| AU | 2014311618 A1 * | 2/2016 | | G10L 21/02 |
| CN | 102742266 A | 10/2012 | | |

(Continued)

OTHER PUBLICATIONS

Written Opinion for International Application No. PCT/CN2019/127139 dated Sep. 23, 2020.

(Continued)

*Primary Examiner* — Rashawn N Tillery
(74) *Attorney, Agent, or Firm* — Perilla Knox & Hildebrandt LLP; Kenneth A. Knox

(57) ABSTRACT

The present disclosure relates to a page presentation method, a display system, and a storage medium. The method includes presenting, on a page, a map comprising one or more virtual objects used to identify one or more corresponding electronic signs; and binding a sign content to be presented to the electronic signs corresponding to the one or more virtual objects.

11 Claims, 9 Drawing Sheets

(51) Int. Cl.
*G06F 3/04842* (2022.01)
*G06F 3/0486* (2013.01)
*G06F 3/16* (2006.01)

(56) References Cited

U.S. PATENT DOCUMENTS

| | | | |
|---|---|---|---|
| 2005/0193060 A1* | 9/2005 | Barton | G06Q 10/00 709/204 |
| 2007/0279484 A1* | 12/2007 | Derocher | H04N 7/15 348/E7.083 |
| 2009/0198816 A1 | 8/2009 | Bannister et al. | |
| 2011/0268263 A1* | 11/2011 | Jones | H04M 3/563 379/202.01 |
| 2012/0204118 A1* | 8/2012 | Lefar | G06F 3/04883 715/756 |
| 2012/0314067 A1 | 12/2012 | Kitabayashi | |
| 2014/0095223 A1* | 4/2014 | Oxenham | G06Q 10/02 705/5 |
| 2015/0007056 A1* | 1/2015 | Cohen | H04W 4/02 715/753 |
| 2015/0332327 A1 | 11/2015 | Friedlander et al. | |
| 2016/0119413 A1 | 4/2016 | Antipa et al. | |
| 2018/0329603 A1* | 11/2018 | Sawaki | G02B 27/017 |
| 2020/0177645 A1* | 6/2020 | Yoshida | H04L 65/1093 |
| 2020/0250713 A1 | 8/2020 | Kawano | |
| 2020/0322395 A1* | 10/2020 | Copley | H04L 65/4015 |
| 2021/0073742 A1* | 3/2021 | Janakiraman | G06Q 10/1095 |
| 2022/0011997 A1* | 1/2022 | Chen | G09G 3/344 |
| 2022/0157342 A1* | 5/2022 | Kliushkin | G11B 27/036 |
| 2022/0200816 A1* | 6/2022 | Ji | H04L 12/1818 |
| 2022/0247971 A1* | 8/2022 | McNelley | H04N 7/157 |
| 2023/0318862 A1* | 10/2023 | Bran | H04N 7/15 709/204 |

FOREIGN PATENT DOCUMENTS

| | | | |
|---|---|---|---|
| CN | 202495239 U | | 10/2012 |
| CN | 107589941 A | | 1/2018 |
| CN | 109088926 A | | 12/2018 |
| CN | 109816320 A | * | 5/2019 |
| CN | 305307377 S | | 8/2019 |
| CN | 110221801 A | | 9/2019 |
| CN | 110460991 A | | 11/2019 |
| EP | 2088552 A1 | | 8/2009 |
| IN | 109816320 A | | 5/2019 |
| JP | 2001166757 A | | 6/2001 |
| JP | 2001339799 A | * | 12/2001 |
| JP | 2002058069 A | | 2/2002 |
| JP | 2002099268 A | | 4/2002 |
| JP | 2008139616 A | | 6/2008 |
| JP | 2011004128 A | | 1/2011 |
| JP | 2011166693 A | | 8/2011 |
| JP | 2011166694 A | | 8/2011 |
| JP | 2012164319 A | | 8/2012 |
| WO | 2011099577 A1 | | 8/2011 |
| WO | 2018186118 A1 | | 10/2018 |

OTHER PUBLICATIONS

Extended European Search Report for EP Patent Application No. 19945469.5 dated Nov. 28, 2022.
G. Prabhakar, J. Rajesh and P. Biswas, "Comparison of Three Hand Movement Tracking Sensors as Cursor Controllers," 2016 International Conference on Control, Instrumentation, Communication and Computational Technologies (ICCICCT), Kumaracoil, India, 2016, pp. 358-364, doi: 10.1109/ICCICCT.2016.7987974.
First Office Action for Japan Patent Application No. 2021-570999 of Jan. 22, 2024.
Second Office Action for China Patent Application No. 2019800031617 of Jan. 21, 2024.

* cited by examiner

| meeting table card management | list of meetings | Previous day | 2019-11-10 | 📅 | the day after | | | |
|---|---|---|---|---|---|---|---|---|
| meeting management ⌄ | meeting name: | | | meeting name: ⌄ | meeting name: ⌄ | | | |
| device management ⌄ | | | | | | | | |
| template management ⌄ | meeting number | meeting name | meeting location | meeting roome | start time | end time | meeting status | operation | operation |
| user management ⌄ | 1 | A | xx building | 10-01 | 17:00 | 17:30 | not started | edit seat arrangement | cancel meeting |
| system management ⌄ | 2 | B | xxbuilding | 10-02 | 14:00 | 15:30 | not started | edit seat arrangement | cancel meeting |

FIG. 5

PAGE PRESENTATION METHOD, DISPLAY SYSTEM AND STORAGE MEDIUM

CROSS-REFERENCE TO RELATED APPLICATION

This application is a 35 U.S.C. § 371 national phase application based on International Application No. PCT/CN2019/127139, filed Dec. 20, 2019, the contents of which are incorporated herein by reference.

TECHNICAL FIELD

The present disclosure relates to internet of things technologies and, in particular, to a page presentation method, a display system, and a non-transitory computer-readable storage medium.

BACKGROUND

Signs, such as a table card, cubicle card, house number plate, billboard, etc., are increasingly used in the field of Internet of Things (IoT). For example, table cards, cubicle cards and house number plate are used for meetings; house number plate, elevator signs, bus stop signs, and the like are used for advertising display; and display signs at different locations for exhibitions are used in museums or exhibition halls, and so on.

In some scenarios, some products are fixed at different locations, and there are some inconveniences to product management in different locations. For example, when pushing information on different products, it is needed to establish a correspondence between locations and signs, as well as a correspondence between information and signs.

For example, when a conference is held, the identities of participants in different positions can usually be displayed through the table cards placed in the conference room and the relationship between the table cards and the seats. This requires arranging the table cards. In the traditional seat arrangement method, the printed paper name cards are built into a transparent table card shell, and the table cards are placed at corresponding seats. However, this method requires human operation, the labor cost is relatively high, and the accuracy and efficiency of seat arrangement are relatively low.

SUMMARY

Embodiments of the present disclosure provide a page presentation method, a display system and a computer-readable storage medium.

According to a first aspect, there is provided a page presentation method, including:
  presenting, on a page, a map including one or more virtual objects used to identify one or more corresponding electronic signs; and
  binding a sign content to be presented to the electronic sign corresponding to the one or more virtual objects.

According to embodiments, binding a sign content to be presented to the electronic signs corresponding to the one or more virtual objects includes:
  presenting mode prompt information used to identify a binding mode; and
  in response to an input operation on the mode prompt information, binding the sign content to be presented to the electronic signs corresponding to the one or more virtual objects.

According to embodiments, presenting mode prompt information used to identify a binding mode includes: presenting one or more sign content identifiers;
  wherein in response to an input operation on the mode prompt information, binding the sign content to be presented to the electronic signs corresponding to the one or more virtual objects, includes:
  in response to a selection operation on one of the sign content identifiers and one of the virtual objects, binding the sign content to be presented corresponding to the selected sign content identifier to an electronic sign corresponding to the selected virtual object.

According to various embodiments,
  in response to successive click operations on one of the sign content identifiers and one of the virtual objects, the click operations are determined as a user's selection operation on the one of the sign content identifiers and the one of the virtual objects; or
  in response to a drag operation for dragging one of the sign content identifiers to a location where one of the virtual objects is located, the drag operation is determined as a user's selection operation on the one of the sign content identifiers and the one of the virtual objects; or,
  in response to a voice input instruction for instructing to bind one of the sign content identifiers and one of the virtual objects, the voice input instruction is determined as a user's selection operation on the one of the sign content identifiers and the one of the virtual objects; or,
  in response to a user's eye gaze input instruction for successive gazing at a position of one of the sign content identifiers and one of the virtual objects on the page, the eye gaze input instruction is determined as the user's selection operation on the one of the sign content identifiers and the one of the virtual objects.

According to embodiments, the binding mode includes a random binding mode;
  wherein presenting mode prompt information used to identify a binding mode includes: presenting mode prompt information for the random binding mode;
  wherein in response to an input operation for the mode prompt information, binding the sign content to be presented to the electronic signs corresponding to the one or more virtual objects includes:
  in response to a click operation on the mode prompt information for the random binding mode, binding a sign content to be presented to the electronic signs corresponding to the one or more virtual objects, different electronic signs being randomly bound to sign contents corresponding to different sign content identifiers.

According to embodiments, the binding mode includes a role-based binding mode;
  wherein presenting mode prompt information used to identify a binding mode includes: presenting mode prompt information for the role-based binding mode;
  wherein in response to an input operation on the mode prompt information, binding the sign content to be presented to the electronic signs corresponding to the one or more virtual objects includes:
  in response to a click operation on the mode prompt information for the role-based binding mode, binding the sign content to be presented to the electronic signs corresponding to the one or more virtual objects, according to role information of the sign content to be presented, an importance of positions of the electronic signs corresponding to the virtual objects, and a correspondence between different roles and positions of electronic signs of different importance.

According to embodiments, the page presentation method further includes:
presenting, on a virtual object corresponding to an electronic sign to which a sign content is bond, a corresponding sign content identifier; and
in response to a user's exchange operation on sign content identifiers on any two of the virtual objects, exchanging sign contents of two corresponding electronic signs, and exchanging sign content identifiers presented on the two virtual objects.

According to embodiments, a user's exchange operation on sign content identifiers on any two of the virtual objects, includes:
a user's drag operation for dragging one of two sign content identifiers on the any two of the virtual objects to the other one of the two sign content identifiers; or
a user's successive click operations on the any two of the virtual objects.

According to embodiments, the page presentation method further includes:
presenting a first area, a second area and a third area on the page;
presenting the map in the first area;
presenting sign content identifiers in the second area; and
in response to a selection operation on one of the content identifiers or the virtual object corresponding to the one of the content identifiers, presenting corresponding sign content in the third area.

According to embodiments, the page presentation method further includes:
in response to a selection operation on one of the sign content identifiers or one of the virtual objects, presenting a preview content of a corresponding sign content and/or an edit box of the corresponding sign content in the third area.

According to embodiments, the page presentation method further includes:
in response to a task creation operation in a task creation page, creating a sign display task; and
presenting task information of the created sign display task and operation information of the sign display task, wherein the operation information includes information regarding editing of seat arrangement.

According to embodiments, presenting, on a page, a map including one or more virtual objects used to identify one or more corresponding electronic signs, includes:
presenting, on the page, a plan view containing one or more groups of virtual objects used to identify the corresponding electronic signs;
wherein binding a sign content to be presented to the electronic signs corresponding to the one or more virtual objects, includes:
binding the sign content to be presented to the electronic signs corresponding to the one or more groups of virtual objects.

According to embodiments, the page presentation method further includes:
in response to a user's adding operation for a plurality of electronic signs on a sign adding page, adding device information of the plurality of electronic signs; and
in response to a grouping operation for grouping the plurality of electronic signs based on the device information, establishing at least one group for the plurality of electronic signs.

According to embodiments, the device information includes sign number of the plurality of electronic signs;
wherein in response to a grouping operation for grouping the plurality of electronic signs based on the device information, establishing at least one group for the plurality of electronic signs, includes:
in response to the grouping operation for grouping the plurality of electronic signs based on the sign numbers, establishing at least one group for the plurality of electronic signs;
or, the device information includes position numbers of the plurality of electronic signs,
wherein in response to a grouping operation for grouping the plurality of electronic signs based on the device information, establishing at least one group for the plurality of electronic signs, includes:
in response to the grouping operation for grouping the plurality of electronic signs based on the position numbers, establishing at least one group for the plurality of electronic signs.

According to a second aspect of the present disclosure, there is provided a display system, including a display and a processor;
wherein the processor is configured to present, on the display, a map including one or more virtual objects used to identify one or more corresponding electronic signs; and
bind a sign content to be presented to the electronic signs corresponding to the one or more virtual objects.

According to embodiments, the processor is configured to present mode prompt information used to identify a binding mode, and in response to an input operation on the mode prompt information, bind the sign content to be presented to the electronic signs corresponding to the one or more virtual objects.

According to embodiments, the processor is configured to present one or more sign content identifiers on the display; and, in response to a selection operation on one of the sign content identifiers and one of the virtual objects, bind the sign content to be presented corresponding to the selected sign content identifier to an electronic sign corresponding to the selected virtual object.

According to embodiments, the processor respond to the selection operation on one of the sign content identifiers and one of the virtual objects by the following steps:
in response to successive click operations on one of the sign content identifiers and one of the virtual objects, determining the click operations as a user's selection operation on the one of the sign content identifiers and the one of the virtual objects; or
in response to a drag operation for dragging one of the sign content identifiers to a location where one of the virtual objects is located, determining the drag operation as a user's selection operation on the one of the sign content identifiers and the one of the virtual objects; or,
in response to a voice input instruction for instructing to bind one of the sign content identifiers and one of the virtual objects, determining the voice input instruction as a user's selection operation on the one of the sign content identifiers and the one of the virtual objects; or,
in response to a user's eye gaze input instruction for successive gazing at a position of one of the sign content identifiers and one of the virtual objects on the page, determining the eye gaze input instruction as the user's selection operation on the one of the sign content identifiers and the one of the virtual objects.

According to embodiments, the binding mode includes a random binding mode;

the processor is configured to present the mode prompt information of the random binding mode on the display; in response to a click operation on the mode prompt information for the random binding mode, bind a sign content to be presented to the electronic signs corresponding to the one or more virtual objects, different electronic signs being randomly bound to sign contents corresponding to different sign content identifiers.

According to embodiments, the binding mode includes a role-based binding mode;

the processor is configured to present mode prompt information for the role-based binding mode; in response to a click operation on the mode prompt information for the role-based binding mode, bind the sign content to be presented to the electronic signs corresponding to the one or more virtual objects, according to role information of the sign content to be presented, an importance of positions of the electronic signs corresponding to the virtual objects, and a correspondence between different roles and positions of electronic signs of different importance.

According to embodiments, the processor is configured to present, on a virtual object corresponding to an electronic sign to which a sign content is bond, a corresponding sign content identifier; and in response to a user's exchange operation on sign content identifiers on any two of the virtual objects, exchange sign contents of two corresponding electronic signs, and exchange sign content identifiers presented on the two virtual objects.

According to embodiments, the process or is configured to respond to a user's exchange operation on sign content identifiers on any two of the virtual objects by the following steps:

in response to a user's drag operation for dragging one of two sign content identifiers on the any two of the virtual objects to the other one of the two sign content identifiers; or in response to a user's successive click operations on the any two of the virtual objects.

According to embodiments, the processor is configured to:

present a first area, a second area and a third area on the display;

present the map in the first area;

present sign content identifiers in the second area; and in response to a selection operation on one of the content identifiers or the virtual object corresponding to the one of the content identifiers, present corresponding sign content in the third area.

According to embodiments, the processor is configured to:

in response to a selection operation on one of the sign content identifiers or one of the virtual objects, present a preview content of a corresponding sign content and/or an edit box of the corresponding sign content in the third area.

According to embodiments, the processor is configured to:

in response to a task creation operation in a task creation page, create a sign display task; and present task information of the created sign display task and operation information of the sign display task on the display, wherein the operation information includes information regarding editing of seat arrangement.

According to embodiments, the processor is configured to: present, on the display, a plan view containing one or more groups of virtual objects used to identify the corresponding electronic signs; bind the sign content to be presented to the electronic signs corresponding to the one or more groups of virtual objects.

According to embodiments, the processor is configured to: in response to an adding operation for a plurality of electronic signs on a sign adding page, add device information of the plurality of electronic signs; and in response to a grouping operation for grouping the plurality of electronic signs based on the device information, establish at least one group for the plurality of electronic signs.

According to embodiments, the device information includes sign number of the plurality of electronic signs;

the processor is configured to: in response to the grouping operation for grouping the plurality of electronic signs based on the sign numbers, establish at least one group for the plurality of electronic signs;

or, the device information includes position numbers of the plurality of electronic signs, the processor is configured to: in response to the grouping operation for grouping the plurality of electronic signs based on the position numbers, establishing at least one group for the plurality of electronic signs.

According to a third aspect, there is provided a non-volatile computer-readable storage medium having computer programs stored thereon, wherein when the computer programs are executed by a computer, the computer is caused to perform the any one of the above methods.

It should be understood that the above general description and the following detailed description are only exemplary and explanatory, and are not intended to limit the present disclosure.

BRIEF DESCRIPTION OF THE DRAWINGS

The drawings, which are incorporated into the specification and constitute a part of the specification, show embodiments consistent with the disclosure, and are used to explain the principles of the disclosure together with the specification. Understandably, the drawings in the following description are only some examples of the present disclosure. For those of ordinary skill in the art, other drawings can be obtained from these drawings without creative work.

FIG. 5 is a schematic diagram of a conference management interface according to an embodiment of the present disclosure.

DETAILED DESCRIPTION

Example embodiments will now be described more fully with reference to the drawings. However, the example embodiments can be implemented in various forms, and should not be construed as being limited to the examples set forth herein; on the contrary, the provision of these embodiments makes the present disclosure more comprehensive and complete, and fully conveys the concept of the example embodiments to those skilled in the art. The described features, structures, or characteristics can be combined in one or more embodiments in any suitable way.

It should be noted that in the present disclosure, the terms "include", "configured with", and "provided in" are used to mean open-ended inclusion, and mean in addition to the listed elements/components, there may also be other elements/components. The terms "first", "second", and so on are only used as for distinguishing different objects, not a limitation on the number or order of the objects.

Figure 1:
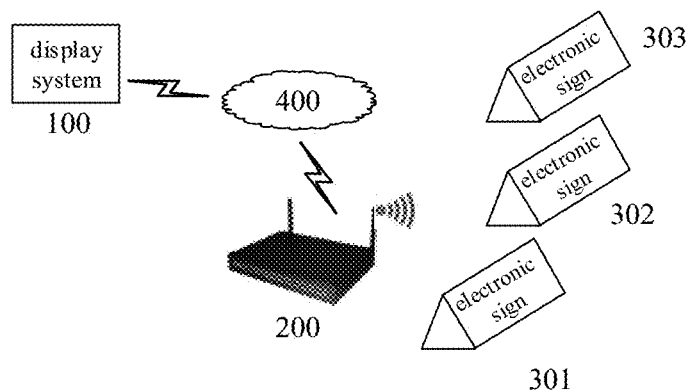
FIG. 1 is a schematic diagram of an exemplary system architecture in which a page presentation method according to an embodiment of the present disclosure can be applied.

FIG. 1 is a schematic diagram of an exemplary system architecture to which a page presentation method according to an embodiment of the present disclosure can be applied. The system architecture includes: a display system 100, a gateway device 200, an electronic sign 301, an electronic sign 302, and an electronic sign 303.

The display system 100 may be an independent display device with information processing capability, such as a conference machine in an office scene, which contains a display and a processor. The display system can also be a system that includes a display and a connectionless device, a system that includes a display and a server, or a system that includes a display and a gateway.

The display system 100 and the gateway device 200 are connected through a network 400. The gateway device 200 receives the contents (hereinafter referred to as the sign contents) that needs to be displayed or presented or executed by the electronic sign 301, electronic sign 302, and electronic sign 303 from the display system 100, and when the electronic sign 301, electronic sign 302, and electronic sign 303 are connected to the network gateway device 200, the sign contents are sent to corresponding electronic signs.

The network 400 may include different types of networks such as wired network, a wireless network, or fiber optic cables. Each of the electronic sign 301, the electronic sign 302, and the electronic sign 303 may be a single-sided electronic sign or a double-sided electronic sign. The double-sided electronic sign can be assembled from two independent single-sided electronic signs back-to-back, or can be a double-sided display with two display surfaces which face away from each other. The contents displayed on the two sides of the double-sided electronic sign can be the same or different.

It should be understood that FIG. 1 only shows an example in which the system includes one gateway device, one network and three electronic signs. Depending implementation needs, there can be any number of gateway devices, networks and electronic signs. In addition, the display system 100 can be connected to multiple gateway devices at the same time, and each gateway device can be connected to multiple electronic signs at the same time.

The electronic sign can be a display device that can display content, and can be a device that can be a wall-mounted device, a device that can be placed on another device, or can be a portable device. For example, the electronic sign may be a table card, a cubicle card, a house number plate, or an electronic work card (also called electronic work plate) for meetings; a house number plate, an elevator sign, a bus stop sign, and the like for advertising display; display signs at different locations for exhibitions in museums or exhibition halls, and so on.

Figure 2:
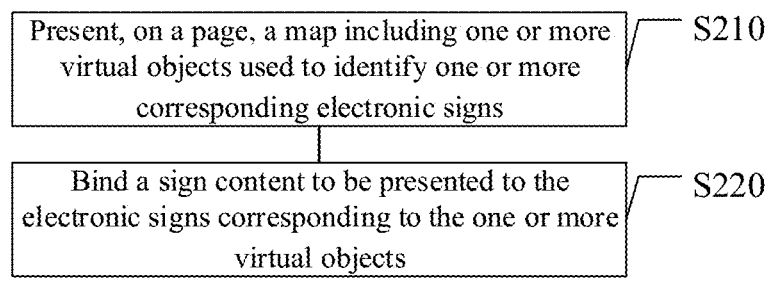
FIG. 2 is a flowchart of a page presentation method according to an embodiment of the present disclosure.

FIG. 2 is a flowchart of a page presentation method according to an embodiment of the present disclosure. The method can be applied to the display system 100, and can be executed by a processor, a gateway, a server, and so on and displayed on a display. The method includes the following steps:

In step S210, a map including one or more virtual objects used to identify one or more corresponding electronic signs is presented on a page.

In step S220, a sign content to be presented is bond to the electronic signs corresponding to the one or more virtual objects.

In the page presentation method according to embodiments of the present disclosure, each electronic sign can be visually presented by a corresponding virtual object. In this way, a user can bind sign contents to be presented to electronic signs corresponding to one or more virtual objects through the virtual objects of the electronic signs displayed on the page, and user operation is more intuitive and convenient.

The following describes the page presentation method according to embodiments of the present disclosure in more detail.

In embodiments of the present disclosure, after the electronic signs are added to the display system, the electronic signs may be optionally grouped, and then a map for identifying one or more virtual objects corresponding to the electronic signs can be displayed on the page. The following first introduces the addition and grouping of electronic signs.

When adding electronic signs, in response to the user's adding operation for adding a plurality of electronic signs on the sign adding page, device information of the plurality of electronic signs is added.

According to embodiments, the user can add device information of the plurality of electronic signs to the display system, and the display system can manage the electronic signs according to the device information. In an exemplary embodiment of the present disclosure, for each electronic sign, the user can input the device information of the electronic sign on the sign addition page. The device information may include a device ID, sign number of the electronic sign, sign name, specification (such as size, resolution, and so on), device type (such as electronic paper or liquid crystal display), etc. According to other embodiments, the device information can further include a position number corresponding to the electronic sign, that is, the number of the position where the electronic sign is located. For example, position number can be a conference room number, an exhibition hall number, etc. The position number can be used to group electronic sign, which will be described later in detail.

A user can input the device information of an electronic sign manually or by a code scanning gun. If there is repeated device information, an error message can be displayed. After electronic signs are added, the sign adding page can display the device information of the electronic signs. If the user wants to add a new electronic sign in the future, the user can add the new electronic sign to the display system as described above.

After the user inputs the device information of electronic signs into the display system, if a plurality of groups of electronic signs are required in an application scenario, the user can divide the electronic signs into at least two groups. For example, when managing all electronic table cards in multiple conference rooms, the table cards are grouped according to the conference rooms which the electronic signs belong to, and the table cards in one conference room are divided into a group; or, the electronic signs may be grouped according to a correspondence between different table cards and different conference tables, and the table cards on one conference table are divided into a group.

In some implementations, the signs do not need to be grouped. For example, when the server manages a plurality of signs in an exhibition hall, the signs are arranged in sequence according to the exhibition locations and form a group. In this case, the server does not need to perform grouping tasks.

According to embodiments, the user can group the plurality of electronic signs based on the device information. In response to a grouping operation for grouping the plurality of electronic signs based on the device information, at least one group is established for the plurality of electronic signs.

In an exemplary embodiment of the present disclosure, at least one group for the plurality of electronic signs may be established in response to a grouping operation for grouping the plurality of electronic signs based on the sign numbers. In yet another exemplary embodiment of the present disclosure, at least one group for the plurality of electronic signs may be established in response to a grouping operation for grouping the plurality of electronic signs based on position numbers. That is, when adding an electronic sign, a corresponding position number can be set for the electronic sign, and then electronic signs with the same position number can be directly divided into a group, and electronic signs with different position numbers are divided into different groups.

In addition, when creating a group, a grouping manner can be set. For example, the electronic signs can be grouped according to the conference rooms to which the electronic signs belong to, and the table cards in the same conference room are divided into a group. Further, configuration can be designated for a group. For example, the configuration includes the number of electronic signs that can be placed. The group name, related description and other information can be set. It should be noted that the relative positions of the electronic signs can be represented by virtual objects. Therefore, the map of each group can be obtained by grouping.

The map shows the positions of the grouped signs displayed on the page, or a plan or three-dimensional diagram of the distribution positions and the environment where the electronic signs are located.

Figure 3:
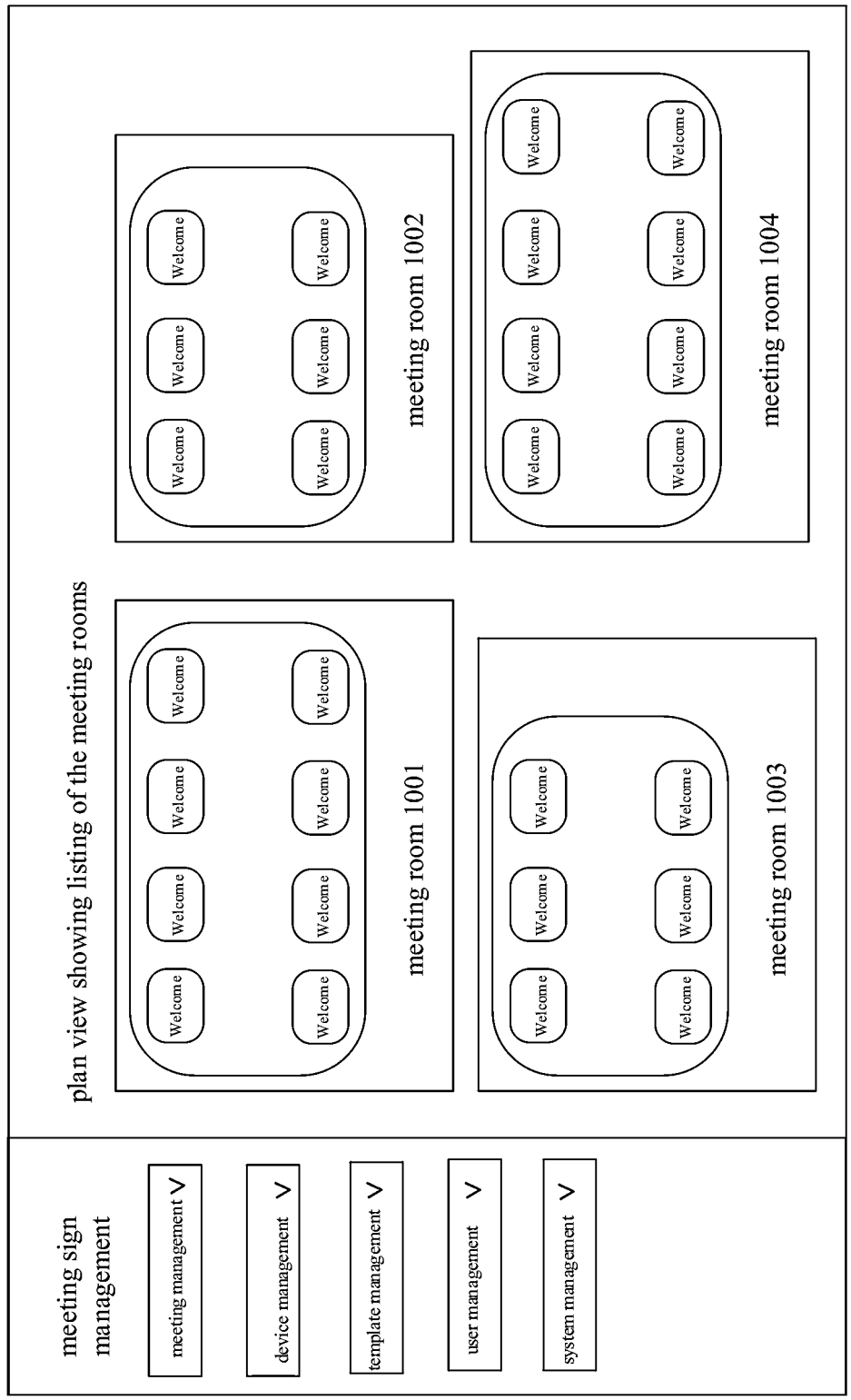
FIG. 3 is a plan view showing locations of conference room groupings according to an embodiment of the present disclosure.
Figure 4:
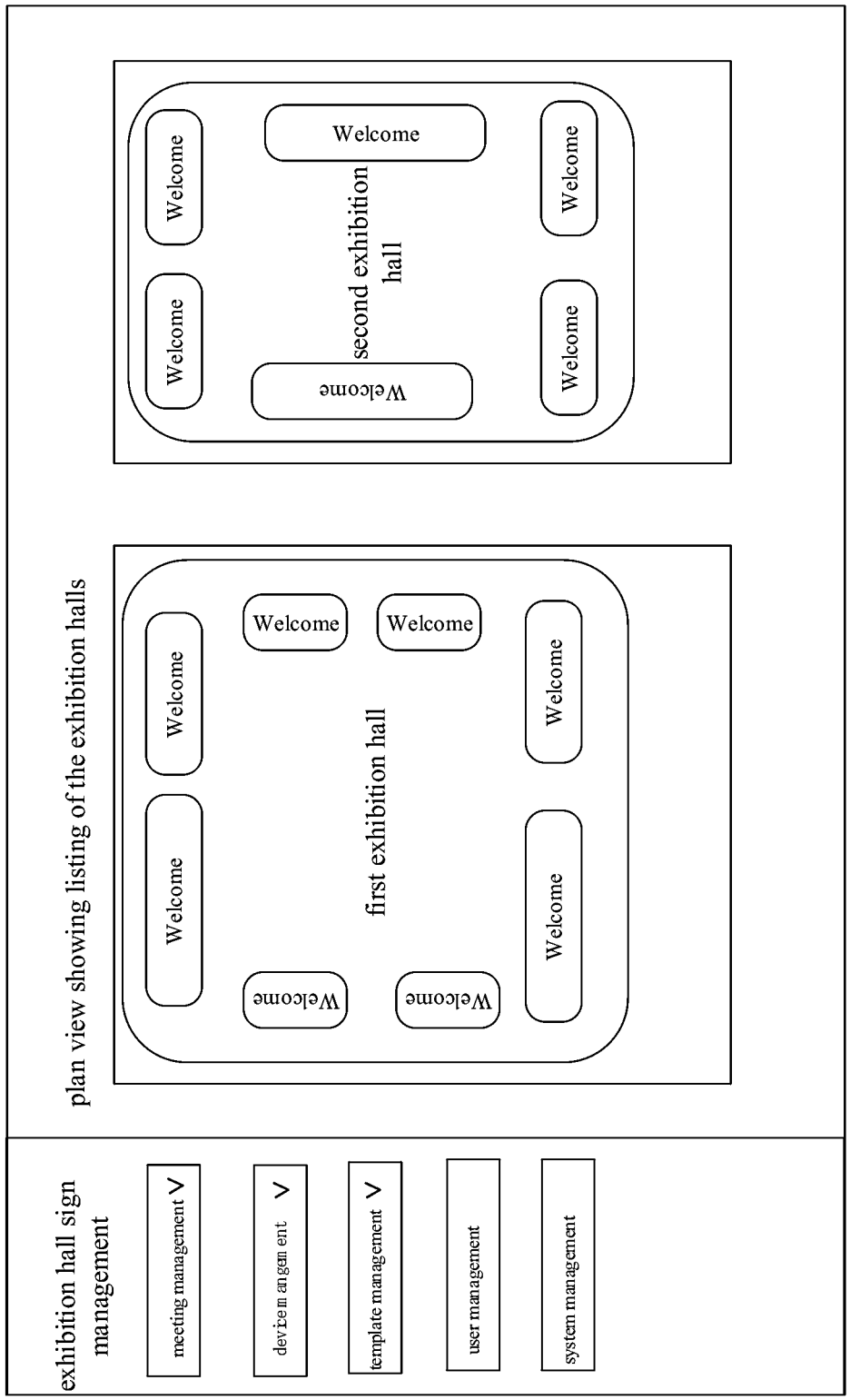
FIG. 4 is a plan view showing locations of exhibition hall grouping according to an embodiment of the present disclosure.

After the electronic signs are grouped, a plan view of the distribution positions of one or more groups of virtual objects used to identify the corresponding electronic signs can be displayed on the page, and the distribution positions are the relative positions of the electronic signs. FIG. 3 is a plan view of distribution positions of conference room groups in an embodiment of the present disclosure. The plan view includes 4 conference room groups, each of which contains multiple virtual objects. When no sign content is bond to an electronic sign corresponding to a virtual object, default information can be displayed on the virtual object, for example, "Welcome". FIG. 4 is a plan view showing distribution positions in exhibition hall groups according to an embodiment of the present disclosure. In FIG. 4, there are two exhibition hall groups, and each group includes multiple virtual objects. In other embodiments, there may be groups divided based on cubicles, groups divided based on house number plates, groups divided based on billboards and so on, which are not listed here. A group in the conference room groups is taken as an example for description.

When there is a sign display task, the user can create a sign display task. The sign display task can be a conference sign display task, a house number plate display task, or a cubicle sign display task. For example, if a user wants to use a certain conference room for a meeting, he can create a display task for the conference room group on the task creation page. Specifically, the user can input task information in the task creation interface, and the task information includes a task start time, task end time, task location (i.e., meeting room location), etc. Different task locations correspond to different groups. When the user selects the task location, the selected group is determined. When the sign display task created by the user conflicts with other created sign display tasks (for example, there may be a time conflict in the same task location), an error prompt message can be displayed.

In embodiments of the present disclosure, the display system creates a sign display task in response to the user's task creation operation in the task creation page, and displays the task information of the created sign display task and the operation information of the sign display task. The operation information includes information regarding editing of seat arrangement.

FIG. 5 is a schematic diagram of a conference management interface according to an embodiment of the present disclosure. It can be seen that for a created conference, the meeting start time, the meeting end time, the meeting location and the meeting room can be displayed, and the meeting name, the meeting number, the meeting status, and so on can be displayed. Then, the user can edit the created meeting, such as seat editing. The user clicks "edit seating" or clicks "edit seat arrangement" or clicks "Edit" in the interface shown in FIG. 5 to perform step S210.

In step S210, a map containing one or more virtual objects for identifying the corresponding electronic signs is displayed on the page.

In embodiments of the present disclosure, the map containing one or more virtual objects displayed on the page may be a plan view, a three-dimensional map, and so on, and the positional relationship between multiple virtual objects may be displayed in the map. The virtual objects can have a one-to-one correspondence with the electronic signs, and the positional relationship between the virtual objects can represent the positional relationship between the corresponding electronic signs. The virtual objects may be icons, movable icons, or control icons that can be used to represent corresponding electronic signs.

Figure 6:
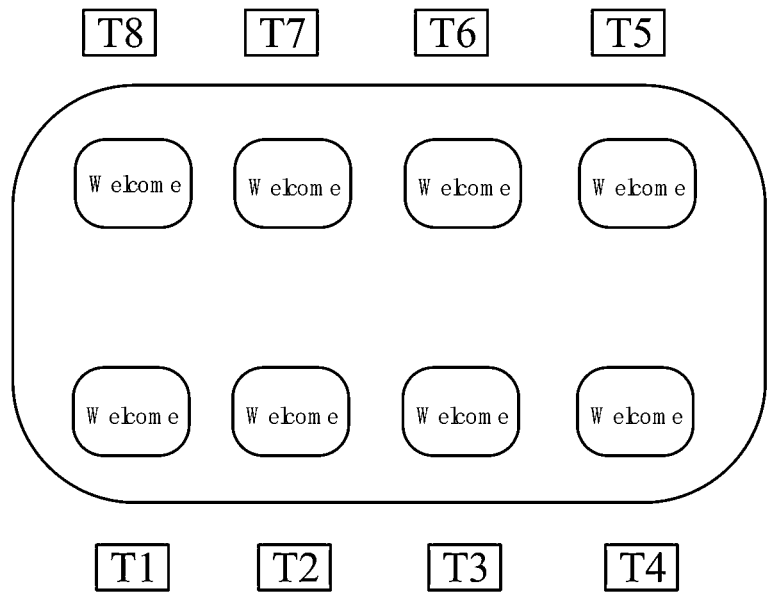
FIG. 6 is a distribution diagram including multiple virtual objects according to an embodiment of the disclosure.

According to embodiments, the above-mentioned map may also include a virtual reference object, and accordingly, the map may also display the positional relationship between the virtual objects and the virtual reference object. For example, when the virtual objects are virtual seats, the virtual reference object may be a virtual conference table or the like. FIG. 6 is a distribution map including multiple virtual objects according to an embodiment of the present disclosure. The map includes 8 virtual objects, and the relative positions of the 8 virtual objects can be seen. The positions of the virtual objects can be represented as T1~T8, each virtual object can correspond to an electronic sign, and each electronic sign can have a corresponding sign number.

In step S220, the sign content to be presented is bound to the electronic signs corresponding to one or more virtual objects.

Figure 7:
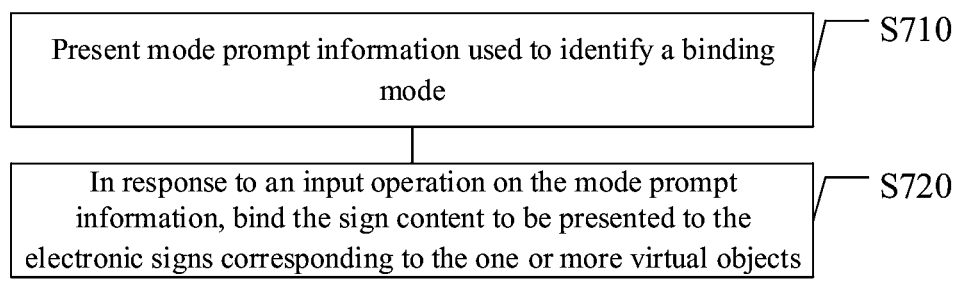
FIG. 7 is a flowchart of a method for binding electronic signs and sign contents according to an embodiment of the disclosure.

In embodiments of the present disclosure, the term "binding" or "bind" or "bond" refers to establishing a correspondence or association between the sign content and the electronic sign(s), that is, displaying the sign content to be presented on a corresponding electronic sign. The binding of electronic sign(s) and sign content is shown in FIG. 7. The binding may include the following steps:

In step S710, mode prompt information for identifying a binding mode is presented.

In embodiments of the present disclosure, multiple binding modes may be included, and the binding modes correspond to different binding methods. The mode prompt information of the binding mode can also be displayed on the page, and the user can select a binding mode according to the mode prompt information.

In step S720, in response to an input operation on the mode prompt information, the sign content to be presented is bond to the electronic signs corresponding to the one or more virtual objects.

For example, the user can select a binding mode by clicking on the mode prompt information, or input operations such as voice input instructions for the mode prompt information. The display system binds the sign content to be presented to the electronic signs corresponding to one or more virtual objects according to the binding mode selected by the user.

In an exemplary embodiment of the present disclosure, the binding mode includes: a manual binding mode. One or more sign content identifiers can be displayed on the page. In response to a selection operation on one of the sign content identifiers and one of the virtual objects, the sign content to be presented corresponding to the selected sign content identifier is bond to an electronic sign corresponding to the selected virtual object.

It should be noted that sign content identifier is an identifier for indicating the content of the sign. Different types of sign contents have different sign content identifiers. For example, when the sign content is participant information, the sign content identifier may be the name of the participant; when the sign content is content to be displayed in an exhibition hall, the sign content identifier may be the location of the exhibition hall. It can be seen that in the manual binding mode, the sign content to be presented is the sign content corresponding to the sign content identifier.

When performing manual binding, the user can select a sign content identifier and a virtual object to establish the correspondence between the sign content identifier and the virtual object, so as to associate the electronic sign corresponding to the selected virtual object with the sign content to be presented corresponding to the selected sign content identifier.

According to embodiments, in response to successive click operations on one of the sign content identifiers and one of the virtual objects, the click operations are determined as a user's selection operation on the one of the sign content identifiers and the one of the virtual objects. According to some other embodiments, in response to a drag operation for dragging one of the sign content identifiers to a location where one of the virtual objects is located, the drag operation is determined as a user's selection operation on the one of the sign content identifiers and the one of the virtual objects. According to some other embodiments, in response to a voice input instruction for instructing to bind one of the sign content identifiers and one of the virtual objects, the voice input instruction is determined as a user's selection operation on the one of the sign content identifiers and the one of the virtual objects. According to some other embodiment, in response to a user's eye gaze input instruction for successive gazing at a position of one of the sign content identifiers and one of the virtual objects on the page, the eye gaze input instruction is determined as the user's selection operation on the one of the sign content identifiers and the one of the virtual objects.

In yet another exemplary embodiment of the present disclosure, the binding mode includes a random binding mode. The mode prompt information of the random binding mode can be displayed on the page. In response to a click operation on the mode prompt information for the random binding mode, a sign content to be presented is bond to the electronic signs corresponding to the one or more virtual objects, and different electronic signs are randomly bound to sign contents corresponding to different sign content identifiers.

It should be noted that in the random binding mode, the sign content to be presented can be preset. For example, for a certain conference room group, the participants can be fixed. The sign content can be randomly bound to the electronic signs corresponding to the virtual objects. There is a one-to-one correspondence between the electronic signs and the sign contents.

In yet another exemplary embodiment of the present disclosure, the binding mode includes a role-based binding mode. The mode prompt information of the role-based binding mode can be displayed on the page. In response to a click operation on the mode prompt information for the role-based binding mode, the sign content to be presented is bond to the electronic signs corresponding to the one or more virtual objects, according to role information of the sign content to be presented, an importance of positions of the electronic signs corresponding to the virtual objects, and a correspondence between different roles and positions of electronic signs of different importance.

Figure 8:
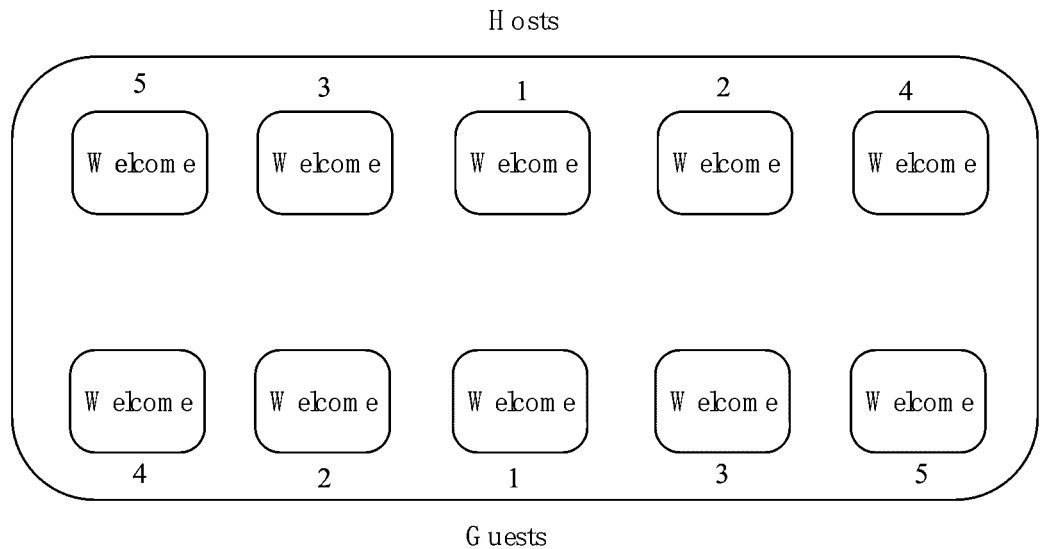
FIG. 8 is a schematic diagram showing importance of electronic sign positions corresponding to multiple virtual objects.

FIG. 8 is a schematic diagram showing importance of the positions of the electronic signs corresponding to multiple virtual objects. Seats are divided into hosts seats and guests seats. The importance of the positions of the electronic signs corresponding to the virtual objects increases as the number of the virtual objects decreases, that is, the electronic sign corresponding to the virtual object number 1 is the most important, and the electronic sign corresponding to the virtual object number 5 is the least important. The role information of the sign content to be presented can be the rank or grade of the participants in an organization. The higher the rank of a participant is, the more important the position of the corresponding electronic sign will be. Therefore, the electronic sign corresponding to the virtual object can be bound to the sign content to be presented according to the correspondence.

In an exemplary embodiment of the present disclosure, when the sign content to be presented is bound to the electronic sign(s), the corresponding sign content identifier may also be displayed on the virtual object corresponding to the electronic sign to which the sign content is bond. In response to a user's exchange operation on sign content identifiers on any two of the virtual objects, sign contents of two corresponding electronic signs are exchanged, and sign content identifiers presented on the two virtual objects are exchanged.

Figure 9:
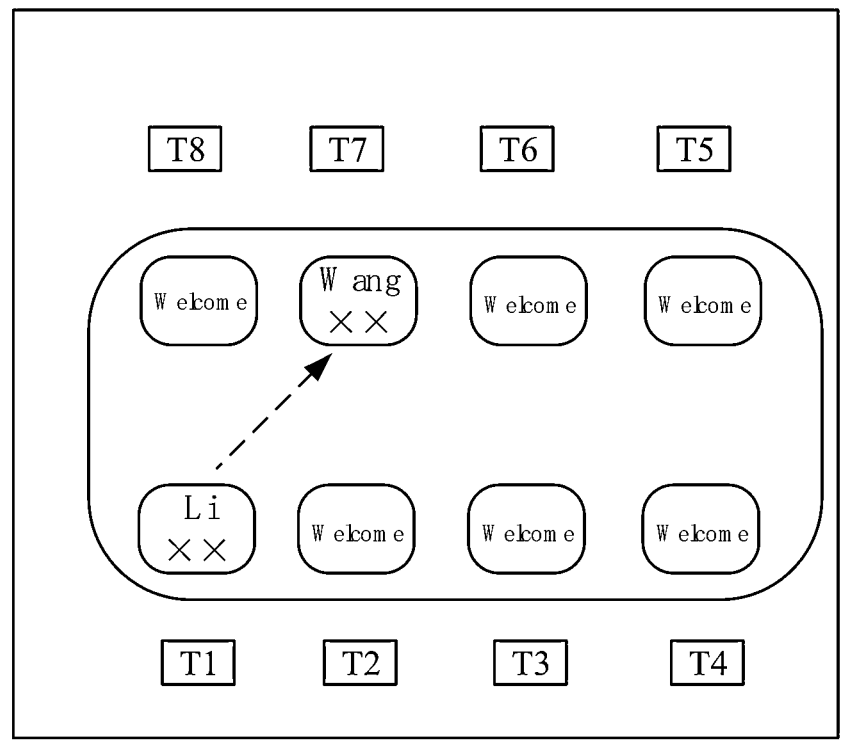
FIG. 9 is a schematic diagram of presentation of the virtual objects before an exchange operation according to an embodiment of the disclosure.
Figure 10:
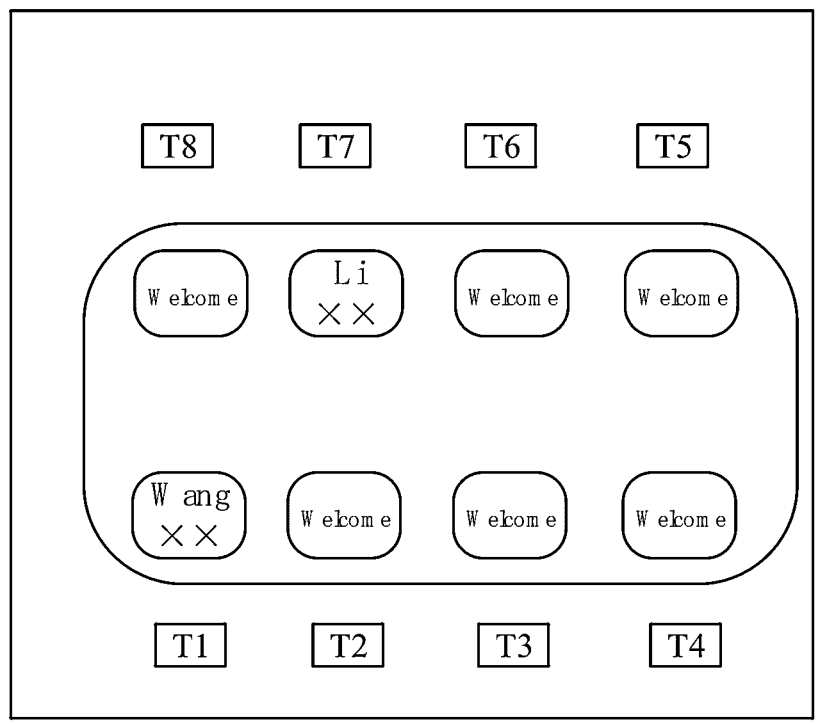
FIG. 10 is a schematic diagram of presentation of the virtual objects after the exchange operation according to an embodiment of the disclosure.

According to embodiments, in response to a user's drag operation for dragging one of two sign content identifiers on the any two of the virtual objects to the other one of the two sign content identifiers, in response to a user's successive click operations on the any two of the virtual objects, sign contents of two corresponding electronic signs are exchanged, and sign content identifiers presented on the two virtual objects are exchanged. According to embodiments, the user can also drag a virtual object and its corresponding sign content identifier to another virtual object and its corresponding sign content identifier at the same time, so as to exchange the sign contents of the two electronic signs and the sign content identifiers of the two virtual objects. Referring to FIG. 9, "Li X X" is displayed on the virtual object at position T1, and "Wang X X" is displayed on the virtual object at position T7. The user drags the "Li X X" displayed on the virtual object at T1 to the "Wang X X" displayed on the virtual object at T7, then "Wang X X" will be displayed on the virtual object at position T1, and "Li X X" will be displayed on the virtual object at position T7, as shown in FIG. 10. It should be understood that the sign content identifiers displayed on the virtual object are exchanged, and the sign contents of the electronic signs corresponding to the virtual objects are accordingly exchanged.

In addition, the user can also click on two virtual objects one after the other to exchange the sign content identifiers displayed on the two virtual objects, and exchange the sign contents of the two corresponding electronic signs.

Figure 11:
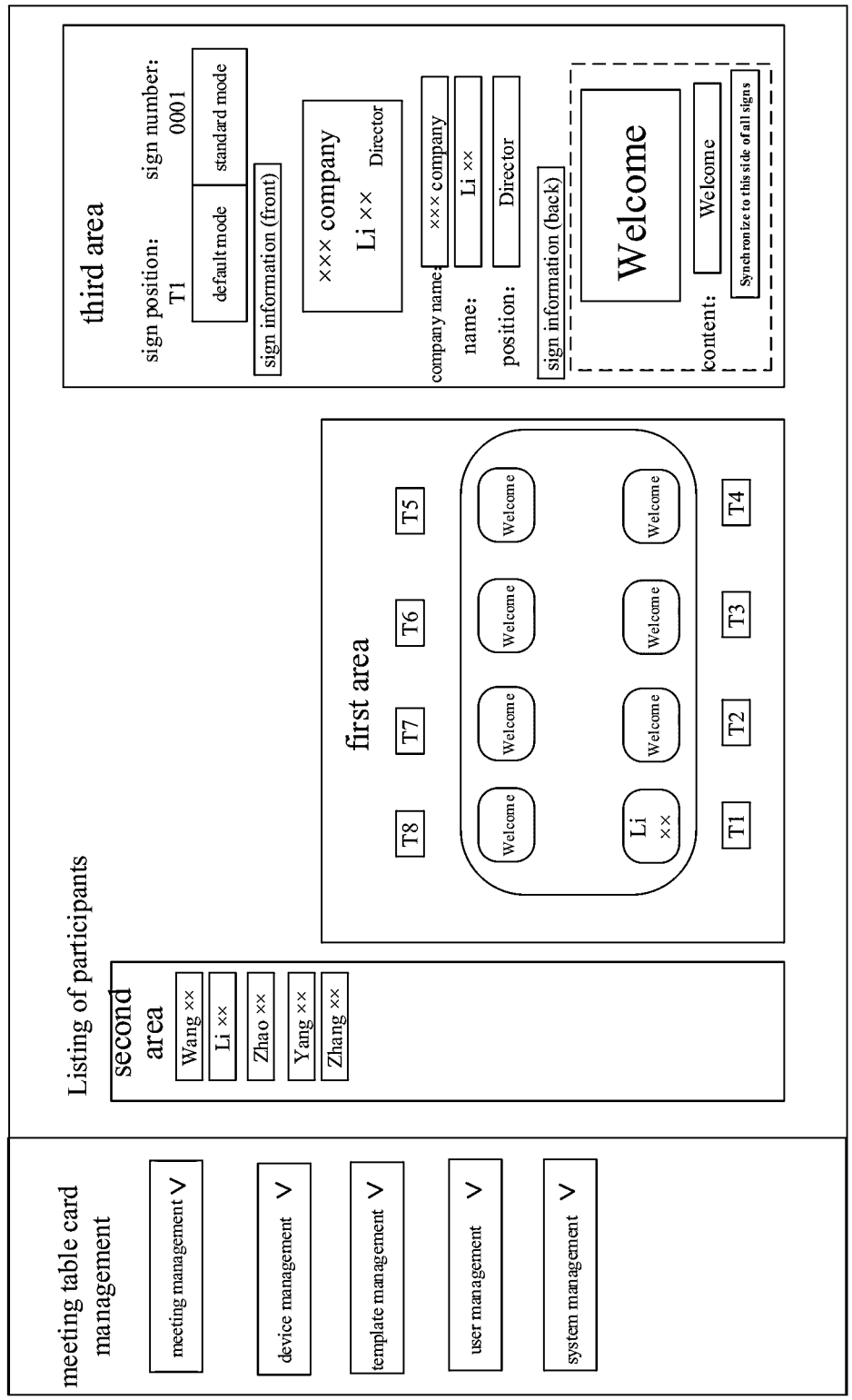
FIG. 11 is a schematic diagram showing a conference seat editing interface according to an embodiment of the present disclosure.

FIG. 11 is a schematic diagram of a conference seat editing interface according to an embodiment of the present disclosure. A first area, a second area, and a third area are displayed on the page, which are located in the left, middle, and right areas of the page. The map can be displayed in the first area, and the sign content identifiers can be displayed in the second area. Here, the sign content identifiers can be list of participants. The list of participants may be entered temporarily by the user or obtained after importing a pre-edited file into the system.

In an exemplary embodiment of the present disclosure, in response to a selection operation on a sign content identifier or the virtual object corresponding to the sign content identifier, the corresponding sign content may be displayed in the third area. For example, after the user clicks on the sign content identifier, or the virtual object corresponding to the sign content identifier, the corresponding sign content is displayed in the third area. Alternatively, after the user inputs a voice instruction for the sign content identifier or the virtual object corresponding to the sign content identifier, the corresponding sign content is displayed in the third area. The sign content can be the company/department of the participants, the rank or grade of the participants in the company/department, etc.

In yet another exemplary embodiment of the present disclosure, in response to a selection operation on one of the sign content identifiers or one of the virtual objects, a preview content of a corresponding sign content and/or an edit box of the corresponding sign content is presented in the third area. In this way, the user can also edit the sign content in the edit box. For example, if the name or rank of the participant is incorrect, the user can edit it. Moreover, for the case where both sides of the electronic sign displays information, the user can make different settings for the contents to be displayed on both sides of the electronic sign. That is, the electronic sign can display different sign contents on both sides, or can display the same sign content on both sides. For example, the sign content can be displayed on the front side, and default information can be displayed on the back side.

In embodiments of the present disclosure, the preview content of the sign content can also be displayed in the third area. The preview content can be displayed according to a display template selected by the user. For example, the type of the display template selected by the user can also be displayed in the third area. The types of display templates may include a default mode and a standard mode. In response to a mode switching operation, the preview content corresponding to the default mode or the standard mode can be displayed in the third area. Referring to FIG. 11, in the third area, the preview on the front is generated based on the sign content, and the preview on the back is "Welcome", that is, the preview contents on the front and back of the electronic sign are different. In addition, when the preview content on the back is the default content, the preview content can also be synchronized to all electronic signs.

After binding the sign content to the electronic signs corresponding to the virtual objects, the user can click "Submit" to save the sign content bound by the user. At the beginning of the task, the sign content in the created sign display task is sent to the corresponding electronic sign, and at the end of the task, displaying of the sign content on the electronic sign is stopped. In addition, the default content can be displayed on the electronic sign in other time periods other than the task start time to the task end time.

In the page presentation method according to embodiments of the present disclosure, each electronic sign can be visually displayed through a corresponding virtual object. In this way, the user can use the virtual object corresponding to the electronic sign displayed on the page to facilitate editing operations on the content of the electronic sign to be displayed. For example, the sign contents bound to any two electronic signs can be exchanged, and the preview content can be displayed on the page. Because the visualization of the operations, it becomes easy and quick to operate, thereby improving the accuracy and efficiency of arranging electronic signs on the page, and reducing labor costs.

It should be noted that although various steps of the methods in the present disclosure are described in a specific order in the drawings, this does not require or imply that these steps must be performed in the specific order, or that all the steps shown must be performed to achieve the desired result. Additionally or alternatively, some steps may be omitted, multiple steps may be combined into one step, and/or one step may be decomposed into multiple steps, etc.

Figure 12:
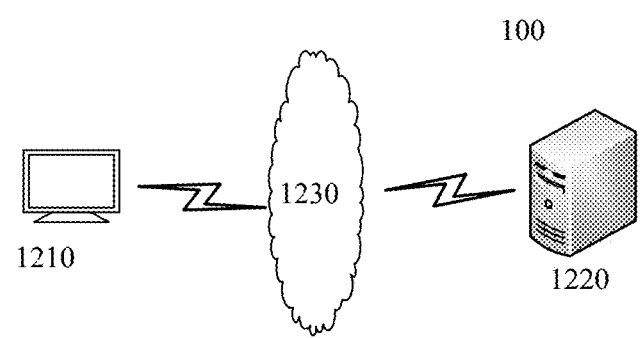
FIG. 12 is a schematic diagram showing architecture of a display system according to an embodiment of the disclosure.

FIG. 12 is a schematic structural diagram of a display system 100 according to an embodiment of the present disclosure. The display system 100 includes a display 1210, a processor 1220, and a network 1230.

The processor 1220 is configured to display a map containing one or more virtual objects for identifying corresponding electronic signs on the display 1210; and bind a sign content to be presented to the electronic signs corresponding to the one or more virtual objects.

The network 1230 is used as a medium for providing a communication link between the display 1210 and the processor 1220. The network 1230 may include various connection types, such as wired or wireless communication links, or fiber optic cables.

The processor 1220 may be deployed in the cloud or locally. The processor 1220 may be a general-purpose processor, including a central processing unit, or a network processor, etc.; the processor 1220 may also be a digital signal processor, an application specific integrated circuit, a field programmable gate array or other programmable logic devices, discrete gates or transistor logic devices, or discrete hardware components, etc.

According to embodiments, the processor is configured to present mode prompt information used to identify a binding mode, and in response to an input operation on the mode prompt information, bind the sign content to be presented to the electronic signs corresponding to the one or more virtual objects.

According to embodiments, the processor is configured to present one or more sign content identifiers on the display; and, in response to a selection operation on one of the sign content identifiers and one of the virtual objects, bind the sign content to be presented corresponding to the selected sign content identifier to an electronic sign corresponding to the selected virtual object.

According to embodiments, the processor responds to the selection operation on one of the sign content identifiers and one of the virtual objects by the following steps:
  in response to successive click operations on one of the sign content identifiers and one of the virtual objects, determining the click operations as a user's selection operation on the one of the sign content identifiers and the one of the virtual objects; or
  in response to a drag operation for dragging one of the sign content identifiers to a location where one of the virtual objects is located, determining the drag operation as a user's selection operation on the one of the sign content identifiers and the one of the virtual objects; or,
  in response to a voice input instruction for instructing to bind one of the sign content identifiers and one of the virtual objects, determining the voice input instruction as a user's selection operation on the one of the sign content identifiers and the one of the virtual objects; or,
  in response to a user's eye gaze input instruction for successive gazing at a position of one of the sign content identifiers and one of the virtual objects on the page, determining the eye gaze input instruction as the user's selection operation on the one of the sign content identifiers and the one of the virtual objects.

According to embodiments, the binding mode includes a random binding mode;
  the processor is configured to present the mode prompt information of the random binding mode on the display; in response to a click operation on the mode prompt information for the random binding mode, bind a sign content to be presented to the electronic signs corresponding to the one or more virtual objects, different electronic signs being randomly bound to sign contents corresponding to different sign content identifiers.

According to embodiments, the binding mode includes a role-based binding mode;
  the processor is configured to present mode prompt information for the role-based binding mode; in response to a click operation on the mode prompt information for the role-based binding mode, bind the sign content to be presented to the electronic signs corresponding to the one or more virtual objects, according to role information of the sign content to be presented, an importance of positions of the electronic signs corresponding to the virtual objects, and a correspondence between different roles and positions of electronic signs of different importance.

According to embodiments, the processor is configured to present, on a virtual object corresponding to an electronic sign to which a sign content is bond, a corresponding sign content identifier; and in response to a user's exchange operation on sign content identifiers on any two of the virtual objects, exchange sign contents of two corresponding electronic signs, and exchange sign content identifiers presented on the two virtual objects.

According to embodiments, the process or is configured to respond to a user's exchange operation on sign content identifiers on any two of the virtual objects by the following steps:
  in response to a user's drag operation for dragging one of two sign content identifiers on the any two of the virtual objects to the other one of the two sign content identifiers; or
  in response to a user's successive click operations on the any two of the virtual objects.

According to embodiments, the processor is configured to:
  present a first area, a second area and a third area on the display;
  present the map in the first area;
  present sign content identifiers in the second area; and
  in response to a selection operation on one of the content identifiers or the virtual object corresponding to the one of the content identifiers, present corresponding sign content in the third area.

According to embodiments, the processor is configured to:
  in response to a selection operation on one of the sign content identifiers or one of the virtual objects, present a preview content of a corresponding sign content and/or an edit box of the corresponding sign content in the third area.

According to embodiments, the processor is configured to:
  in response to a task creation operation in a task creation page, create a sign display task; and
  present task information of the created sign display task and operation information of the sign display task on the display, wherein the operation information includes information regarding editing of seat arrangement.

According to embodiments, the processor is configured to: present, on the display, a plan view containing one or more groups of virtual objects used to identify the corresponding electronic signs; bind the sign content to be presented to the electronic signs corresponding to the one or more groups of virtual objects.

According to embodiments, the processor is configured to: in response to an adding operation for a plurality of electronic signs on a sign adding page, add device information of the plurality of electronic signs; and in response to a grouping operation for grouping the plurality of electronic signs based on the device information, establish at least one group for the plurality of electronic signs.

According to embodiments, the device information includes sign number of the plurality of electronic signs;
  the processor is configured to: in response to the grouping operation for grouping the plurality of electronic signs based on the sign numbers, establish at least one group for the plurality of electronic signs;
  or, the device information includes position numbers of the plurality of electronic signs,
  the processor is configured to: in response to the grouping operation for grouping the plurality of electronic signs based on the position numbers, establishing at least one group for the plurality of electronic signs.

According to an exemplary embodiment of the present disclosure, there is provided a non-volatile computer-readable storage medium having computer programs stored thereon, wherein when the computer programs are executed by a computer, the computer is caused to perform the any one of the above methods.

The non-volatile computer-readable storage medium in embodiments of the present disclosure may be, for example, but is not limited to, an electronic, magnetic, optical, electromagnetic, infrared, or semiconductor system, apparatus, or device, or any combination thereof. More specific examples (non-exhaustive list) of the non-volatile computer-readable storage medium include, but not limited to: an electrical connection with one or more wires, a portable computer magnetic disk, a hard disk, a random access memory, a read-only memory, an erasable programmable read-only memory (EPROM or flash memory), an optical fiber, a portable compact disc read-only memory (CD-ROM), an optical storage device, a magnetic storage device, or any suitable combination of the foregoing.

In the present disclosure, the computer-readable storage medium may be any tangible medium that contains or stores a program, and the program may be used by an instruction execution system, apparatus, or device or may be used in combination with an instruction execution system, apparatus, or device. In embodiments of the present disclosure, the computer-readable signal medium may include a data signal in baseband or propagated as part of a carrier wave, in which a computer-readable program code is carried. This propagated data signal can take many forms, including but not limited to electromagnetic signals, optical signals, or any suitable combination of the foregoing. The computer-readable signal medium may also be any computer-readable medium other than a computer-readable storage medium, and the computer-readable medium may send, transfer, or transmit a program for use by or in connection with an instruction execution system, apparatus, or device.

The program code contained on the computer-readable storage medium may be transmitted using any appropriate medium, including but not limited to wireless, wired, optical fiber cable, radio frequency, etc., or any suitable combination of the foregoing.

Other embodiments of the present disclosure will be apparent to those skilled in the art. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope of the present disclosure is defined by the appended claims.

It should be understood that the present disclosure is not limited to the exact structures that have been described above and shown in the drawings, and various modifications and changes can be made without departing from the scope of the present disclosure. The scope of the present disclosure is defined only by the appended claims.

What is claimed is:

1. A page presentation method, comprising:
    presenting, by a display system, on a page, a map comprising one or more virtual objects used to identify one or more corresponding electronic signs, wherein the one or more electronic signs are connected to the display system via multiple gateway devices, each of the gateway devices is connected to multiple of the electronic signs, and the gateway devices are connected to the display system via a network;
    binding, by a processor of the display system, sign content to be presented to the electronic signs corresponding to the one or more virtual objects;
    presenting, by the display system, on a virtual object corresponding to an electronic sign to which sign content is bonded, a corresponding sign content identifier;
    in response to an exchange operation initiated by a user on sign content identifiers on any two of the virtual objects, exchanging sign contents of two corresponding electronic signs, and exchanging sign content identifiers presented on the two virtual objects; and
    sending, by the display system, the exchanged sign contents to the two corresponding electronic signs via a corresponding gateway device, wherein each of the electronic signs comprises a double-sided display with two display surfaces which face away from each other, and contents displayed on the two display surfaces of the double-sided electronic sign are different;
    wherein binding the sign content to be presented to the electronic signs corresponding to the one or more virtual objects comprises:
        presenting mode prompt information used to identify a binding mode; and
        in response to an input operation on the mode prompt information, binding the sign content to be presented to the electronic signs corresponding to the one or more virtual objects, wherein the binding mode comprises a random binding mode;
    wherein presenting mode prompt information used to identify the binding mode comprises presenting mode prompt information for the random binding mode;
    wherein, in response to an input operation for the mode prompt information, binding the sign content to be presented to the electronic signs corresponding to the one or more virtual objects comprises, in response to a click operation on the mode prompt information for the random binding mode, randomly binding the sign content to be presented to the electronic signs corresponding to the one or more virtual objects, different electronic signs being randomly bound to sign contents corresponding to different sign content identifiers.

2. The method according to claim 1, wherein the exchange operation on sign content identifiers on any two of the virtual objects, comprises:
    a drag operation for dragging one of two sign content identifiers on the any two of the virtual objects to the other one of the two sign content identifiers; or
    successive click operations on the any two of the virtual objects.

3. The method according to claim 1, further comprising:
    presenting a first area, a second area and a third area on the page;
    presenting the map in the first area;
    presenting sign content identifiers in the second area; and
    in response to a selection operation on one of the content identifiers or the virtual object corresponding to the one of the content identifiers, presenting corresponding sign content in the third area.

4. The method according to claim 3, further comprising:
    in response to a selection operation on one of the sign content identifiers or one of the virtual objects, presenting a preview content of a corresponding sign content and/or an edit box of the corresponding sign content in the third area.

5. The method according to claim 1, further comprising:
in response to a task creation operation in a task creation page, creating a sign display task; and
presenting task information of the created sign display task and operation information of the sign display task, wherein the operation information comprises information regarding editing of seat arrangement.

6. The method according to claim 1, wherein presenting, on a page, a map comprising one or more virtual objects used to identify a corresponding electronic sign, comprises:
presenting, on the page, a plan view containing one or more groups of virtual objects used to identify the corresponding electronic signs;
wherein binding the sign content to be presented to the electronic signs corresponding to the one or more virtual objects, comprises:
binding the sign content to be presented to the electronic signs corresponding to the one or more groups of virtual objects.

7. The method according to claim 6, further comprising:
in response to an adding operation for a plurality of electronic signs on a sign adding page, adding device information of the plurality of electronic signs; and
in response to a grouping operation for grouping the plurality of electronic signs based on the device information, establishing at least one group for the plurality of electronic signs.

8. The method according to claim 7, wherein the device information comprises sign number of the plurality of electronic signs;
wherein in response to a grouping operation for grouping the plurality of electronic signs based on the device information, establishing at least one group for the plurality of electronic signs, comprises:
in response to the grouping operation for grouping the plurality of electronic signs based on the sign numbers, establishing at least one group for the plurality of electronic signs;
or, the device information comprises position numbers of the plurality of electronic signs,
wherein in response to a grouping operation for grouping the plurality of electronic signs based on the device information, establishing at least one group for the plurality of electronic signs, comprises:
in response to the grouping operation for grouping the plurality of electronic signs based on the position numbers, establishing at least one group for the plurality of electronic signs.

9. A display system, comprising:
a display; and a processor configured to:
present, on the display, a map comprising one or more virtual objects used to identify one or more corresponding electronic signs, wherein the one or more electronic signs are connected to the display system via multiple gateway devices, each of the gateway devices is connected to multiple of the electronic signs, and the gateway devices are connected to the display system via a network; and
bind sign content to be presented to the electronic signs corresponding to the one or more virtual objects;
present on a virtual object corresponding to an electronic sign to which the sign content is bonded, a corresponding sign content identifier; and in response to an exchange operation initiated by a user on sign content identifiers on any two of the virtual objects, exchange sign contents of two corresponding electronic signs, and exchange sign content identifiers presented on the two virtual objects;
send the exchanged sign contents to the two corresponding electronic signs via a corresponding gateway device, wherein each of the electronic signs comprises a double-sided display with two display surfaces which face away from each other, and contents displayed on the two display surfaces of the double-sided electronic sign are different;
present mode prompt information used to identify a binding mode; and
in response to an input operation on the mode prompt information, bind the sign content to be presented to the electronic signs corresponding to the one or more virtual objects;
wherein the binding mode comprises a random binding mode;
wherein the processor is configured to: present mode prompt information for the random binding mode;
wherein the processor is configured to, in response to a click operation on the mode prompt information for the random binding mode, randomly bind the sign content to be presented to the electronic signs corresponding to the one or more virtual objects, different electronic signs being randomly bound to sign contents corresponding to different sign content identifiers.

10. The display system according to claim 9, wherein the processor is further configured to:
present a first area, a second area and a third area on the display;
present the map in the first area;
present sign content identifiers in the second area; and
in response to a selection operation on one of the content identifiers or the virtual object corresponding to the one of the content identifiers, present corresponding sign content in the third area.

11. A non-transitory computer-readable storage medium having program code stored thereon that, when executed by a processor of a display system at least one computing device, directs the display system to perform a page presentation method, comprising:
presenting, on a page, a map comprising one or more virtual objects used to identify one or more corresponding electronic signs, wherein the one or more electronic signs are connected to the display system via multiple gateway devices, each of the gateway devices is connected to multiple of the electronic signs, and the gateway devices are connected to the display system via a network; and
binding sign content to be presented to the electronic signs corresponding to the one or more virtual objects;
presenting on a virtual object corresponding to an electronic sign to which the sign content is bonded, a corresponding sign content identifier; and
in response to an exchange operation initiated by a user on sign content identifiers on any two of the virtual objects, exchanging sign contents of two corresponding electronic signs, and exchanging sign content identifiers presented on the two virtual objects; and
sending the exchanged sign contents to the two corresponding electronic signs via a corresponding gateway device, wherein each of the electronic signs comprises a double-sided display with two display surfaces which face away from each other, and contents displayed on the two display surfaces of the double-sided electronic sign are different;

wherein binding the sign content to be presented to the electronic signs corresponding to the one or more virtual objects comprises:

presenting mode prompt information used to identify a binding mode; and in response to an input operation on the mode prompt information, binding the sign content to be presented to the electronic signs corresponding to the one or more virtual objects;

wherein the binding mode comprises a random binding mode;

wherein presenting mode prompt information used to identify the binding mode comprises: presenting mode prompt information for the random binding mode;

wherein in response to an input operation for the mode prompt information, binding the sign content to be presented to the electronic signs corresponding to the one or more virtual objects comprises:

in response to a click operation on the mode prompt information for the random binding mode, randomly binding the sign content to be presented to the electronic signs corresponding to the one or more virtual objects, different electronic signs being randomly bound to sign contents corresponding to different sign content identifiers.

* * * * *